United States Patent [19]

Hirata et al.

[11] Patent Number: 5,175,850
[45] Date of Patent: Dec. 29, 1992

[54] PROCESSING SYSTEM FOR STORING RELATED INFORMATION WITHOUT MODIFYING SELECTED BASIC DATA OR STORED RELATIONAL DATA IF PREVIOUS STORAGE DETECTED

[75] Inventors: Keiichi Hirata, Kuwana; Yasushi Kawakami, Nagoya; Atsuko Kawasumi, Nagoya; Miyuki Sato, Nagoya; Yoshinari Morimoto, Nagoya; Akihiro Furukawa, Nagoya, all of Japan

[73] Assignee: Brother Kogyo Kabushiki Kaisha, Aichi, Japan

[21] Appl. No.: 323,288

[22] Filed: Mar. 14, 1989

[30] Foreign Application Priority Data

Mar. 16, 1988 [JP] Japan .................................. 63-62805

[51] Int. Cl.⁵ .......................... G06F 3/02; G06F 7/04; G06F 12/02; G06F 15/40
[52] U.S. Cl. ................................ 395/600; 364/225.4; 364/231; 364/231.31; 364/251.7; 364/253.1; 364/253.2; 364/253.3; 364/282.1; 364/282.2; 364/283.4; 364/283.3; 364/282.3; 364/DIG. 1
[58] Field of Search ... 364/200 MS File, 900 MS File; 379/100, 354, 51, 63, 67; 395/425, 600, 400, 800

[56] References Cited

U.S. PATENT DOCUMENTS

| 4,260,854 | 4/1981 | Kolodny et al. | 364/900 |
| 4,317,183 | 2/1982 | Shimizu et al. | 364/900 |
| 4,375,083 | 2/1983 | Maxemchuk | 364/900 |
| 4,677,657 | 6/1987 | Nagata et al. | 379/63 |
| 4,709,387 | 11/1987 | Masuda | 379/354 |
| 4,764,951 | 8/1988 | Kotani et al. | 379/100 |
| 4,773,080 | 9/1988 | Nakajima et al. | 379/100 |
| 4,817,127 | 3/1989 | Chamberlin et al. | 379/67 |
| 4,821,308 | 4/1989 | Hashimoto | 379/57 |
| 4,850,005 | 7/1989 | Hashimoto | 379/51 |

FOREIGN PATENT DOCUMENTS

| 61-220064 | 9/1986 | Japan . |
| 62-271048 | 11/1987 | Japan . |
| 62-291239 | 12/1987 | Japan . |
| 01114936 | 5/1989 | Japan . |
| 01207818 | 8/1989 | Japan . |
| 2143064 | 5/1984 | United Kingdom . |

Primary Examiner—Lawrence E. Anderson
Assistant Examiner—Daniel H. Pan
Attorney, Agent, or Firm—Kane, Dalsimer, Sullivan, Kurucz, Levy, Eisele and Richard

[57] ABSTRACT

A data processing device wherein messages are inputted for a plurality of recipients. The recipients' names are displayed along with the number of messages. When a message is inputted for a new recipient, the recipient's name as well as the message are automatically stored. In the event the recipient's name has already been stored only the message is stored.

12 Claims, 7 Drawing Sheets

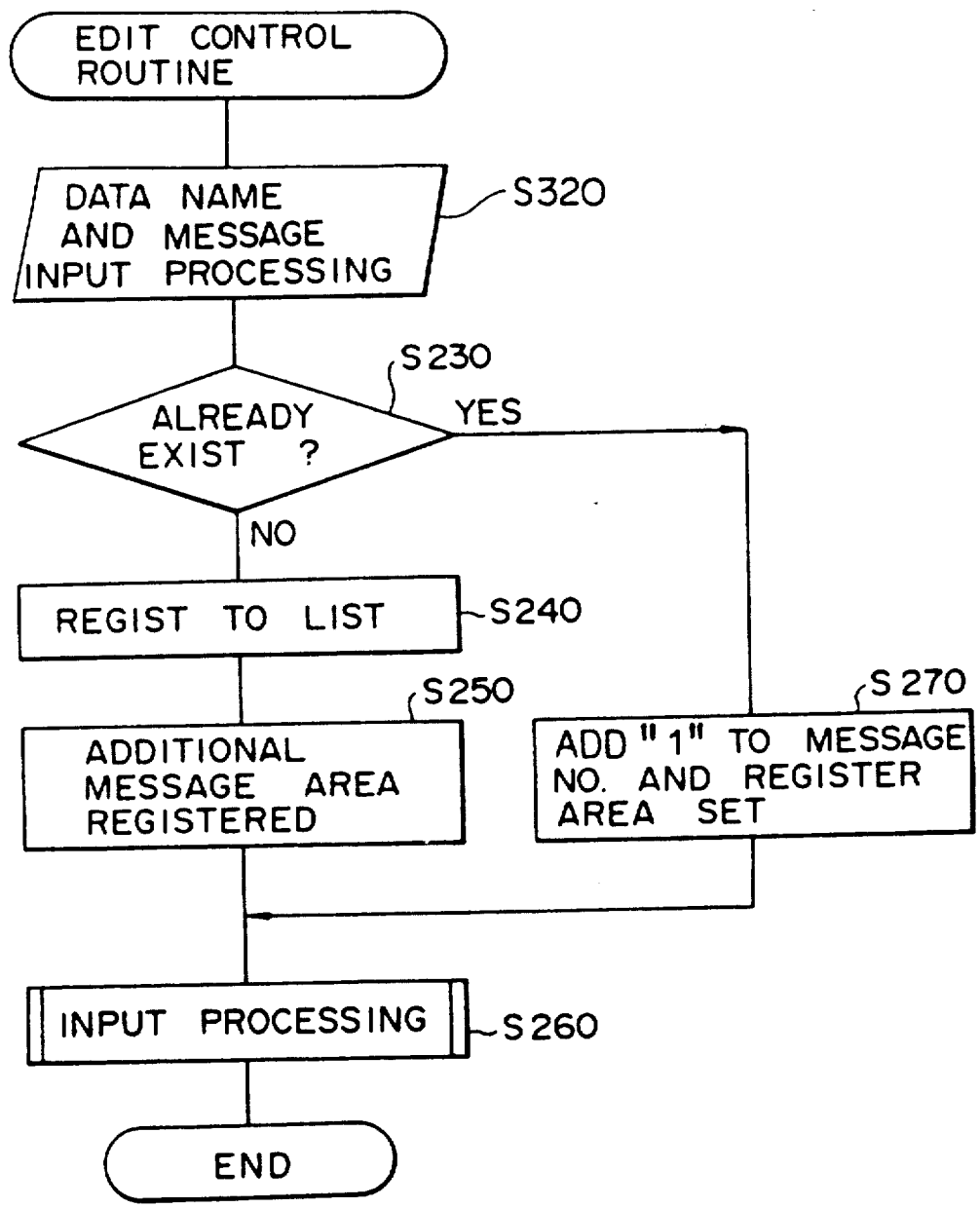

FIG. 4

```
PHONE NAME LIST

| NEW  NAME        |
  Anne  Ford    (2)    Bob    Moris   (2)
  Davy  Johnson (1)    Emily  King    (1)
  Mike  Smith   (1)
         .                    .
         .                    .
```

FIG. 5

```
         PHONE MESSAGE

PHONE MESSAGE

TO [DATA NAME]
FROM
PHONE
MESSAGE

PROCESSING SYSTEM FOR STORING RELATED INFORMATION WITHOUT MODIFYING SELECTED BASIC DATA OR STORED RELATIONAL DATA IF PREVIOUS STORAGE DETECTED

BACKGROUND OF THE INVENTION

This invention relates to a data processing device capable of editing a plurality of data entered through a keyboard into groups in accordance with data name.

In order to store telephone messages to several particular persons, for instance, there has been known a data processing device which is able to edit data (i.e. telephone messages) for each of specific data names (i.e. names of particular persons).

With the above device, however an operator first must specify whether or not the name of a particular person in question has been already registered. In case that the name of the person has not yet been registered the operator selects new registration mode to additionally register the name of the person, while selects additional registration mode in case that the name of the person has been already registered, to enter the message in question.

It is assumed that the operator using such an editing device must prepare a new message as soon as it receives a telephone call even when working on other jobs. In this instance, it occasionally happens that, when entering data such as a telephone message into the editing device, the operator cannot recall whether or not the name of the particular person has already registered. Furthermore, it happens that, it is difficult to decide on whether or not the name of the particular person has already been registered since the telephone call is answered by an untrained person. In short, a problem has been encountered that the necessity for operator's selection of whether or not the data name has already been registered is hampering an efficient use of such an editing device.

Further, there has been an another problem that, if new registration mode is selected by mistake in spite of the fact that additional registration mode should be selected, a plurality of registrations with the same data name are executed, requiring bothersome reediting of the wrong data afterward.

SUMMARY OF THE INVENTION

It is therefore an object of the invention to provide an improved data processing device capable of making registration operations easy.

For this purpose, in one aspect of this invention, there is provided a data processing device comprising input means for inputting character codes and function codes, and display means for displaying character data corresponding to the inputted character codes, said device further comprising:

memory means for storing a plurality of basic data and relational data inputted through said input means, said relational data being stored in said memory means in connection with each of the basic data;

display control means for displaying the basic data stored in said memory means on said display means;

select means for selecting one of the basic data displayed on said display means; and control means for storing in said memory means the relational data inputted through said input means, in connection with the basic data selected by said select means.

In another aspect of this invention, there is provided a data processing device comprising:

basic data input means for inputting a basic data;

relational data input means for inputting a relational data;

memory means for storing a plurality of basic data and relational data inputted through said basic data input means and said relational data input means, said relational data being stored in said memory means in connection with each of said basic data;

display control means for displaying the basic data stored in said memory means on said display means;

select means for selecting one of the basic data displayed on said display means;

detecting means for detecting whether the basic data inputted through said basic data input means has already been stored in said memory means;

first control means for storing both the basic data and the relational data into said memory means, in case it is detected by said detecting means that the inputted basic data has not yet been stored in said memory means;

second control means for storing only the relational data into said memory means in connection with the basic data, in case it is detected by said detecting means that the inputted basic data has been already stored in said memory means; and third control means for storing the relational data inputted through said relational data input means, into said memory means in connection with the selected basic data, in case the basic data is selected by said select means.

In other aspect of this invention, there is provided a data processing device comprising input means for inputting character codes and function codes, and display means for displaying character data corresponding to the inputted character codes, said device further comprising:

memory means for storing a plurality of basic data and relational data inputted through said input means, said relational data being stored in said memory means in connection with each of the basic data, said basic data and said relational data being inputted at the same time through said input means;

detecting means for detecting whether the inputted basic data has already been stored in said memory means;

first control means for storing both the basic data and the relational data into said memory means, in case it is detected by said detecting means that the inputted basic data has not yet been stored in said memory means; and second control means for storing only the relational data into said memory means in connection with the basic data in case it is detected by said detecting means that the inputted basic data has been already stored in said memory means.

DESCRIPTION OF THE ACCOMPANYING DRAWINGS

FIGS. 3A and 3B are flow charts of the processings executed by the electronic control system of FIG. 2;

FIG. 4 is an illustrative view of a list display screen;

FIG. 5 is an illustrative view of a name entry screen;

FIG. 7 is an illustrative view of a message entry screen.

DESCRIPTION OF THE EMBODIMENTS

Figure 1:
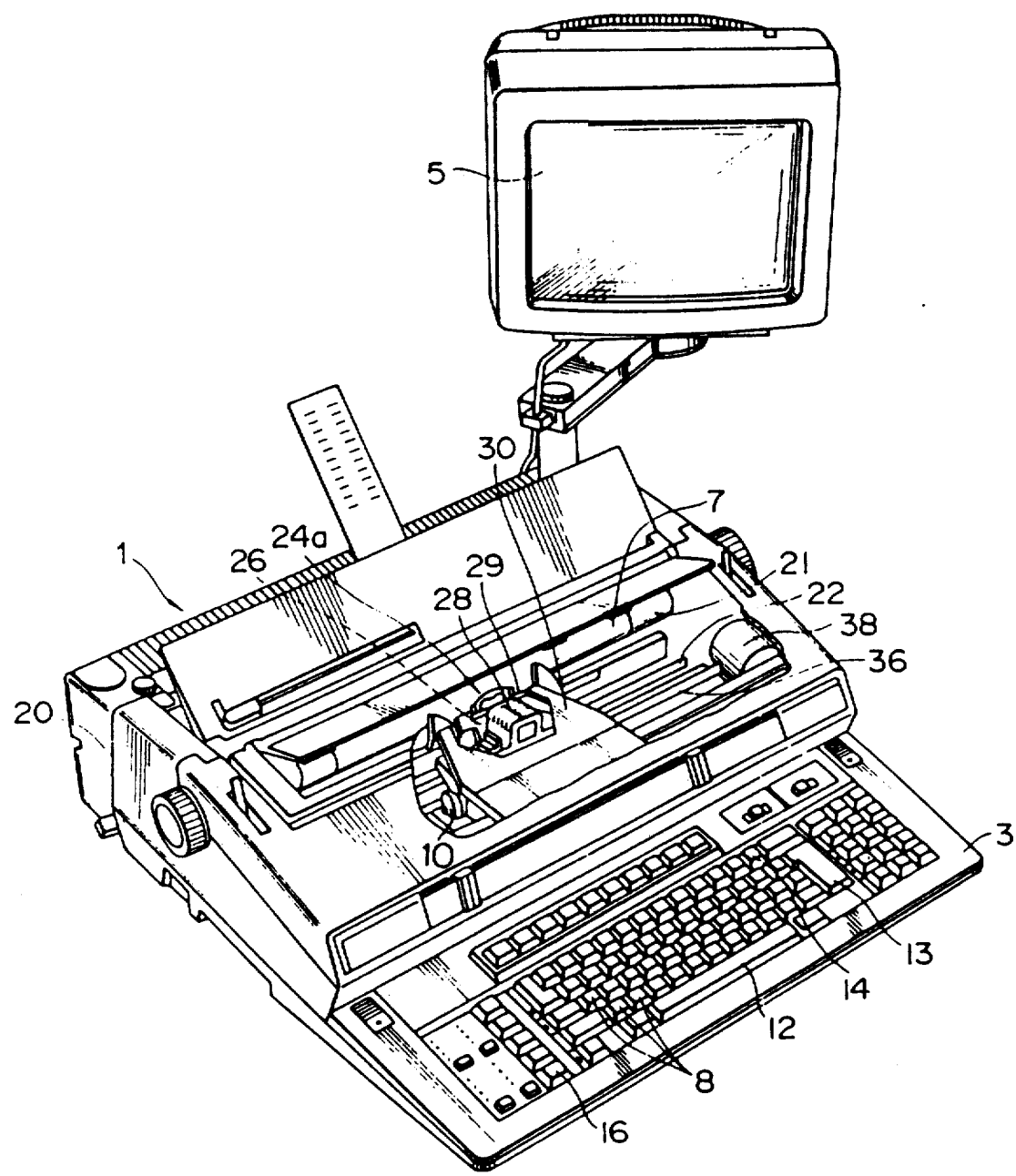
FIG. 1 is a perspective view showing the editing device embodying the present invention.

FIG. 1 shows the data processing device embodying the invention, which is provided with a keyboard 3 including a plurality of keys, a display unit 5 for displaying characters inputted through the keyboard 3, and a printer 7 for printing characters. The keyboard 3 consists of character keys 8, a space key 12, a return key 13, a phone key 14 for specifying start or termination of editing data such as telephone message or the like, an end key 16 for specifying termination of data input, and other function keys.

The display unit 5 displays the character data inputted through the keyboard 3 or a comment for the operator sent from a processing unit 20.

The printer 7 is provided with a platen 21 rotatably carried by the unit 20 to retain a piece of print paper, not shown, a pair of guide bars 22 provided in parallel with the platen 21, and a carriage 10 mounted to move along the pair of guide bar 22. The carriage 10 has mounted thereon a print assembly 24a for printing characters on the print paper and a ribbon cassette 30 accommodating a print ribbon 29. The print assembly 24a consists of a disc type print wheel 26, a print hammer 28 for hammering back of the types on a type wheel 26. Engaged with the carriage 10 is a timing belt 36 which is wound around a pulley, not shown, mounted on the rotary shaft of a stepping motor 38 and a following pulley, not shown, mounted on a frame.

Figure 2:
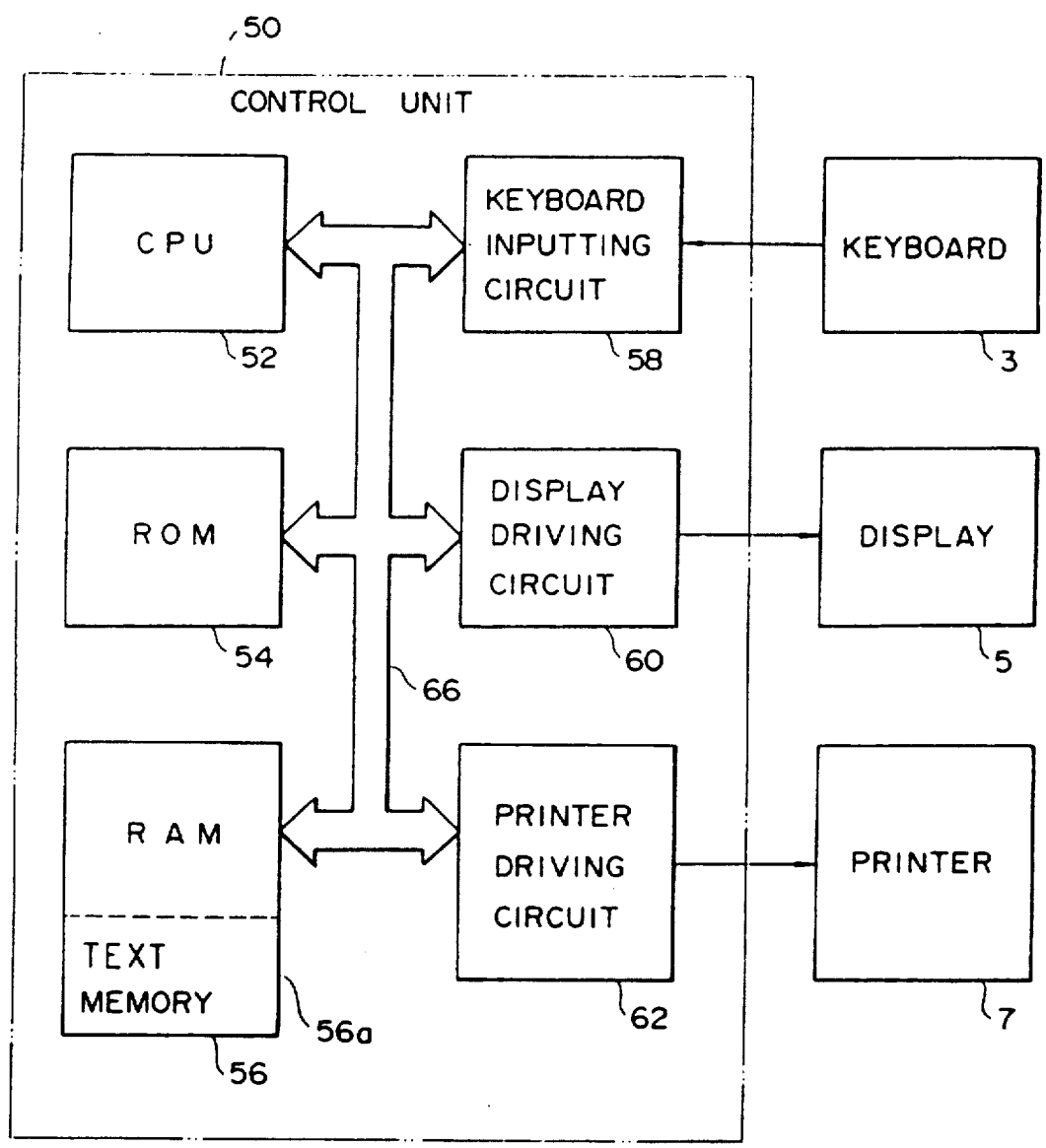
FIG. 2 is a structural view showing an electronic control system and its peripheral units of the editing device of FIG. 1.

The keyboard 3, the display 5 and the printer 7 are all connected with an electronic control circuit 50 incorporated in the unit 20. As seen from the block diagram of FIG. 2, the electronic control circuit 50 is constituted by a CPU (Central Processing Unit) 52, a ROM (Read Only Memory) 54 with control programs and data stored in advance, a RAM (Random Access Memory) 56, a keyboard inputting circuit 58, a display driving circuit 60, a printer driving circuit 62, etc. connected together via a common bus 66. The CPU 52 tentatively reads and writes data required for the RAM 56 in accordance with the program stored in the ROM 54, while executing subsequent input and output processings.

In particular, in a text edit mode, the characters and other necessary information entered through the keyboard 3 are displayed on the display 5 by way of the display driving circuit 60. In a type mode, on the other hand, the characters inputted through the keyboard 3 are printed by driving the printer 7 by means of the printer driving circuit 62.

The RAM 56 contains a text memory 56a which stores the character data inputted through the keyboard 3 together with the display position data.

The edit control routine executed by the electronic control unit 50 is now described with reference to the flow chart of FIG. 3A. The present device executes the main edit control routine together with other control routines as soon as the power is turned on.

When a telephone call is received during an operation in the text edit mode or in the type mode, the phone key 14 is pressed to start entering a telephone message. The processing having been executed is then interrupted and while it stops, the edit control routine is executed as an interruption processing. At first, the data edit file is read so that a list of data names having been already registered, as shown in FIG. 4, appears on the display unit 5 together with the number of messages, and a cursor is placed on "NEW NAME" in the displayed list (step S200 to be referred to simply as S200; the same applies to all other steps). Subsequently, it is examined whether or not the data name is to be additionally registered (S210). This processing determines it as additional registration when the return key 13 is pressed while the cursor is positioned at "NEW NAME" in the displayed list. When, on the other hand, the cursor is moved to the name of existing data already registered and the return key 13 is then pressed, it is determined to be the process of entering message.

In case that it is determined to be additional registration, the display unit 5 displays the screen shown in FIG. 5, awaiting entry of a data name corresponding to a particular person, i.e., to whom this message is to be sent. The data name entered through the keyboard 3 by the operator is displayed on the display unit 5 (S220).

Figure 6:
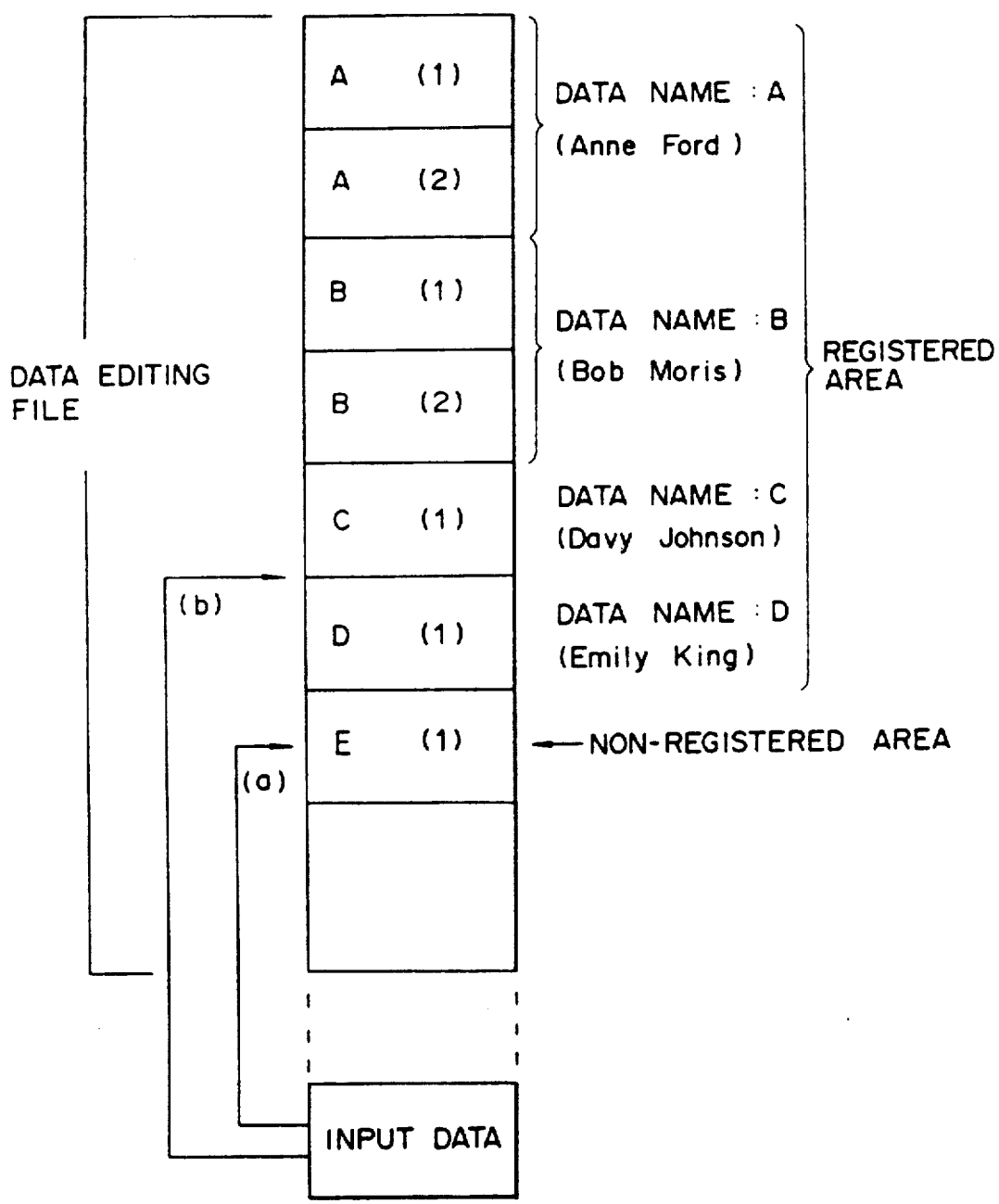
FIG. 6 is an illustrative view of a data file configuration.

After the data name is entered, it is examined whether or not the entered name is already present in the list of registered names (S230). If it is not found in the list, the data name entered is additionally registered in the list (S240). If the additional data name is "Mike Smith", for instance, it is additionally registered as shown in FIG. 4. Further, as shown in FIG. 6, an unregistered storage area is set up as an additional registration area in the data edit file stored in the RAM 56 in a location following the registered area with the existing data already registered (S250). The screen as shown in FIG. 7 then appears on the display unit 5. In accordance with this indication, the operator enters a telephone message through the keyboard 3. When the end key 16 is pressed after the message entry has terminated, alphabetical sorting based upon the data name takes place and the inputted data is registered (S260). Thus, the data name "Mike Smith" in the example above is stored, as shown in FIG. 6, as E(1) and is registered in the unregistered area following the existing registered area.

When, on the other hand, it is determined in the processing of S230, that the data name entered in S220 has been already registered, a registration area is set up next to the last-entered data already registered under the same data name so that an additional message can be registered in the additional registration area (S270). When the data name "Davy Johnson" is entered, for instance, it is determined to be present in the list so that last message number (1) for the data name "Davy Johnson" is incremented to (2) with the registration space taken up between C(1) and D(1).

The screen according to FIG. 7, further, appears on the display unit 5, and the operator enters message data through the keyboard 3 and presses the end key 16. Message entry operation is then identified as terminated and the message data entered through the keyboard 3 is additionally stored in the registration area set up in the processing S270, as indicated by the arrow (b) in FIG. 6 (S260). Therefore, the additional message is added to the existing data under the existing data name C, i.e., "Davy Johnson".

In case that the return key 13 is pressed with the cursor placed on the existing data name at S210, the processings in S270 and S260 are executed for each data name so that editing operation takes place for the data name having been already registered. When the phone key 14 is pressed after executing the processing S260, the edit control routine is terminated, returning to the processing before interruption.

As described above, the editing device according to this embodiment executes additional storage of an additional data to the data already stored under the existing data name in case that the data name corresponding to the data to be additionally stored has been already registered. Further, it executes an additional registration of a data name automatically in case that the data name has not been registered yet.

Consequently, according to the editing device of this embodiment, the operator does not have to decide on whether or not a certain data name has been already registered, therefore, the operator can quickly respond to a telephone call or other works. Even if the operator is untrained with the operation, there is no need of re-editing operation after registration because additional storage takes place on condition that the data name has been already registered in the list. Moreover, since the list is shown on the display unit 5 together with the number of message for each personal name, the operator has only to check with the display unit 5 to see if any additional message has been entered.

FIG. 3B shows a flow chart of a modified edit control routine executed by the electronic control unit 50.

Figure 3A:
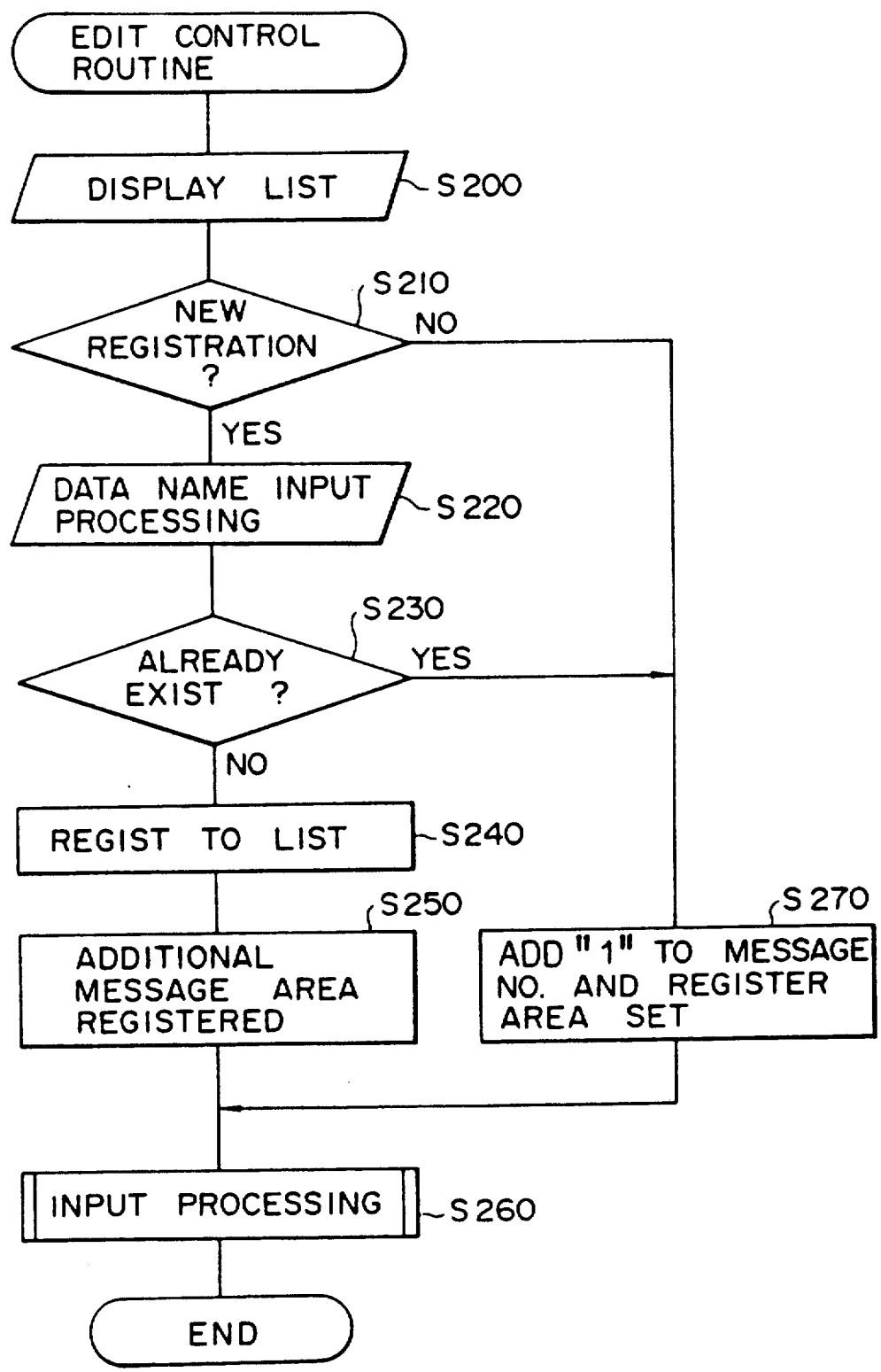

In this modified edit control routine, when the phone key 14 is pressed to start entering a telephone message, the screen shown in FIG. 7 appears on the display unit 5 (S320) instead of the list of the data names as in the flow chart of FIG. 3A. When the return key 13 is pressed upon the entry of the names and the message by the operator, it is determined whether the entered name is already present in the list of registered names (S230) as done in the flow chart of FIG. 3A. The succeeding processings executed in the flow chart of FIG. 3B (S240 through S270) are exactly same as those of FIG. 3A. Thus, according to this modification, it is automatically determined whether the inputted particular personal name has been already stored or not.

Although in the aforementioned embodiments, the data name is considered as a particular person's name and the data as a telephone message, other application of data editing operation are possible, for example, with the data name as a particular experiment item and the data as a result of each experiment.

While embodiments of the present invention have been described above, the present invention is not limited to these embodiments but various other embodiments and modifications are possible without departing the subject matter of the present invention.

What is claim is:

1. A data processing device comprising:
   display means;
   basic data input means for inputting a basic data including a desired character string;
   relational data input means for inputting a relational data;
   memory means for storing a plurality of basic data and relational data inputted through said basic data input means and said relational data input means, said relational data being stored in said memory means in connection with each of the basic data;
   display control means for displaying the basic data stored in the memory means on said display means;
   select means for selecting between a first mode in which one of the basic data displayed on said display means is selected and a second mode in which a desired basic data is inputted;
   detecting means operatively connected with said memory means for detecting whether the basic data inputted through said basic data input means has already been stored in said memory means when said second mode is selected;
   first control means operatively connected with said memory means for storing both the basic data and the relational data into said memory means if it is detected by said detecting means that the inputted basic data has not yet been stored in said memory means when said second mode is selected;
   second control means operatively connected with said memory means for additionally storing only additional relational data into said memory means in connection with the basic data without modifying said basic data or any previously stored relational data, if it is detected by said detecting means that the inputted basic data has been already stored in said memory means when said second mode is selected; and
   third control means operatively connected with said memory means for storing the relational data inputted through said relational data input means, into said memory means in connection with the selected one basic data selected by said select means when said first mode is selected.

2. The device according to claim 1 wherein said select means comprises a cursor displayed on said display means.

3. The device according to claim 1 which further comprises counter means for counting the number of relational data having been stored in said memory means in connection with each of the basic data.

4. The device according to claim 3 wherein said memory means further stores numbers of relational data counted by said counter means.

5. The device according to claim 1 wherein said memory means stores a plurality of basic data in a predetermined order.

6. The device according to claim 1 wherein said basic data comprises personal names and said relational data comprises messages.

7. The device according to claim 6 wherein said memory means stores personal name in alphabetical order.

8. A data processing device comprising input means for inputting character codes and function codes, and display means for displaying character data corresponding to the inputted character codes, said device further comprising:
   memory means for storing a plurality of basic data and relational data inputted through said input means, said relational data being stored in said memory means in connection with each of the basic data;
   detecting means for detecting whether the inputted basic data has already been stored in said memory means;
   first control means operatively connected to said memory means for storing both the basic data and the relational data into the memory means, in case it is detected by said detecting means that the inputted basic data has not yet been stored in said memory means;
   second control means operatively connected to said memory means for storing only additional relational data into said memory means in connection with the basic data without modifying said basic data or any previously stored relational data if it is detected by said detecting means that the inputted basic data has been already stored in said memory means; and, counter means for counting the number of relational data stored in said memory means in connection with each of the basic data.

9. The device according to claim 8 wherein said memory means further stores numbers of relational data counted by said counter means.

10. The device according to claim 8 wherein said memory means stores a plurality of basic data in a predetermined order.

11. The device according to claim 8 wherein said basic data comprises personal names and said relational data comprises messages.

12. The device according to claim 11 wherein said memory means stores personal names in alphabetical order.

* * * * *